United States Patent [19]

Williams

[11] 4,319,460
[45] Mar. 16, 1982

[54] HIGH HUMIDITY FOOD CHILLING SYSTEM

[75] Inventor: Charles E. Williams, Moorefield, W. Va.

[73] Assignee: Hester Industries, Inc., Moorefield, W. Va.

[21] Appl. No.: 183,718

[22] Filed: Sep. 3, 1980

Related U.S. Application Data

[62] Division of Ser. No. 60,987, Jul. 26, 1979, Pat. No. 4,271,683.

[51] Int. Cl.³ .............................................. F24F 3/16
[52] U.S. Cl. ......................................... 62/78; 62/96; 62/121
[58] Field of Search ................. 62/62, 63, 64, 78, 121, 62/96

[56] References Cited

U.S. PATENT DOCUMENTS

| | | | |
|---|---|---|---|
| 1,894,813 | 1/1933 | Zarotschenzeff | 62/64 |
| 1,986,529 | 1/1935 | Ray | 62/91 |
| 2,065,358 | 12/1936 | Zarotschenzeff | 62/64 |
| 2,234,037 | 3/1941 | Anderson | 62/78 |
| 2,834,188 | 5/1958 | Bradford | 62/91 |
| 2,846,318 | 8/1958 | Kelley et al. | 426/510 |
| 3,412,476 | 11/1968 | Astrom | 62/381 |

Primary Examiner—Ronald C. Capossela
Attorney, Agent, or Firm—Laurence R. Brown

[57] ABSTRACT

Warm food products are chilled to a sanitary storage temperature approaching 0° C. without dehydration by introducing them into a cold humid 100% humidity chamber. The humidity is regenerated by spraying refrigerated water and the products are passed through a chilling chamber on a conveyor belt with a spiral path configuration.

Various cabinet features reduce input energy and provide sanitary conditions, such as supplying sanitary water, and filtering droplets of water from the cold moist air to avoid contamination or product disfiguring drip. Provisions are made to prevent a moving conveyor belt from carrying warm air into the chiller or from carrying cold air out of it as it passes continuously through the chiller cabinet. All lubricated mechanical equipment is mounted external to the food processing chilling chamber and access doors are provided for sanitation. The water spray chamber and water flow paths are simply sanitized by replacing the water with a detergent solution.

7 Claims, 5 Drawing Figures

HIGH HUMIDITY FOOD CHILLING SYSTEM

This is a division of application Ser. No. 060,987, filed July 26, 1979, now U.S. Pat. No. 4,271,683.

TECHNICAL FIELD

This invention relates to refrigeration of warm food products and more particularly it relates to a food chilling system passing food products through a chilling chamber on a continuously running conveyor belt.

BACKGROUND ART

Bulk processing of food products is required in industry and many foods are stored at lower temperatures for sanitary purposes to prevent rapid growth of bacteria and spoilage. The very process of cooling lowers the dew point and thus tends to dehydrate food. When large quantities of food products need be processed quickly as when conveyed through a food chiller on a moving belt, it has been difficult to chill them without spending considerable energy and without dehydration, which damages both appearance and flavor. Thus, use of cold air or freezing gases such as $CO_2$ has been done in a very low humidity atmosphere. Also the amount of energy required for freezing food is disproportionately large as compared to the energy required to bring the food temperature to the vicinity of 0° C.

Examples of prior art of this nature are as follows:

Certified Manufacturing, Inc. of Lynwood, Calif. 90262, has marketed a conveyor belt type food processor freezing the food in the presence of $CO_2$ gas.

U.S. Pat. No. 2,846,318—E. J. Kelley et al.—Aug. 5, 1958 uses low pressure water vapor with droplets which are evaporated from the surface of the product. This could not be done, for example, with some food products such as breaded fish, meat or chicken parts since the surface appearance and texture would be altered.

U.S. Pat. No. 3,412,476—S. Astrom—Nov. 26, 1968 passes conveyor belts through a spiral path in a chiller compartment with cold air as a refrigerant.

In addition to the energy inefficiency and the dehydration tendencies of large capacity, rapid food chillers of the prior art, there are many problems relating to sanitation. When conveyors carry food products through a chiller unit there are impurities and contamination that can accumulate along the conveyor tracks and in the chilling system, thus requiring frequent sanitation.

Most prior art systems are ill constructed to permit the critical access, cleaning and sanitation features required by licensing authorities in food processing plants.

Accordingly, it is an objective of this invention to improve the foregoing defects of the prior art by supplying efficient rapid chilling apparatus and methods for processing large quantities of food such as are handled on a continuously running conveyor.

Other objects, features and advantages of the invention will be found set forth hereinafter.

BRIEF DISCLOSURE OF THE INVENTION

To provide high energy efficiency rapid chilling and large volume food throughput while reducing dehydration usually encountered in fast chilling of food products, chilled water is passed in heat exchange contact with warm food products moved in a spiral path on a conveyor belt. Continuously refrigerated water is carried by cold humid air at a temperature approaching 0° C. and a humidity approaching 100%, as produced by circulating air through a water spray mist. The spiral conveyor belt moves toward the source of chilled damp air circulated from the spray mist.

An insulated chilling chamber houses both the water spray equipment and the conveyor spiral which enters and exits the housing from loading and unloading stations respectively. The humid chilled air is circulated by a fan in a path reducing the entrance of hot air with the conveyor and the exit of cold air with the conveyor, and is stripped of water droplets which can carry contamination into the system by deposit on food and may blemish such food products as fish, meat or chicken products and produce.

Other features contribute to both energy efficiency and sanitation as will be evident from the more detailed description which follows.

DETAILED DESCRIPTION OF A PREFERRED EMBODIMENT

Figure 1:
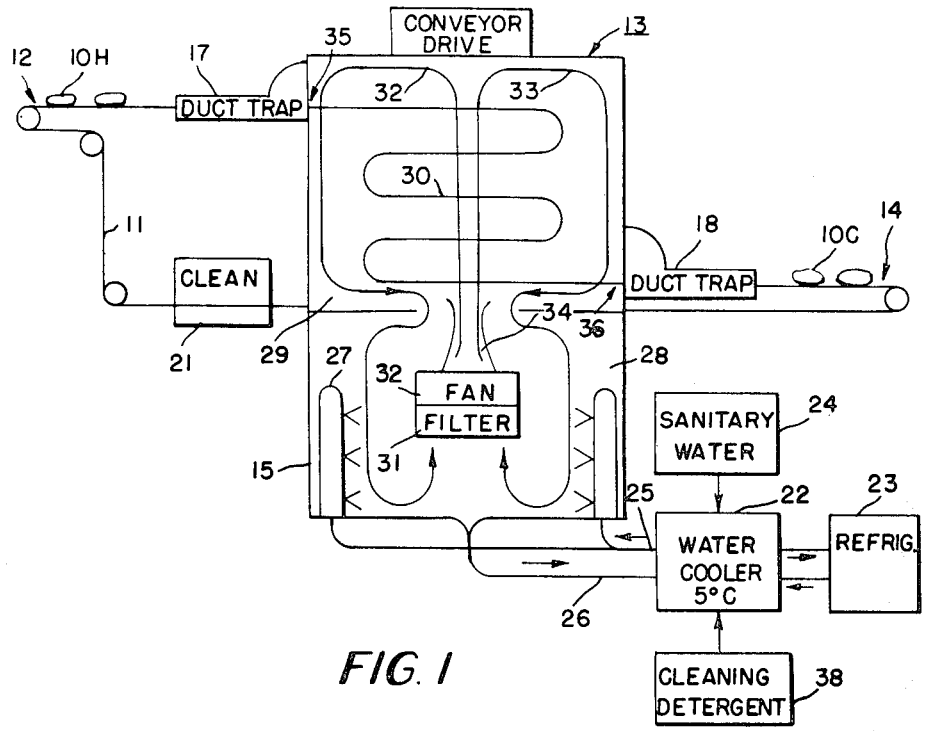
FIG. 1 is a schematic system diagram of the food chilling system afforded by this invention.
Figure 2:
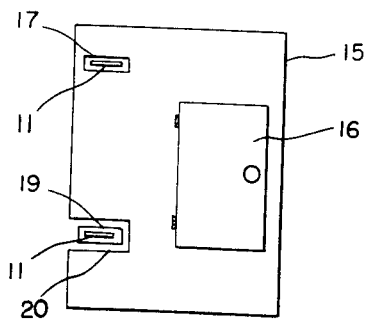
FIG. 2 is a left side view sketch of the cabinet housing the food chilling chamber of FIG. 1.

As may be seen from the general system layout of FIG. 1, warm food products 10H such as fish, meat, produce or fowl, which may come directly from a cooker or previous food processing unit, are placed on the endless continuously running conveyor belt 11 at a loading station 12 and after processing through the food chiller unit 13 are removed as cooled products 10C at the unloading station 14. The chiller unit is housed in an insulated wall cabinet 15, which as shown in FIG. 2, has access doors 16 in each side for entry to clean, sanitize and maintain the unit. The conveyor belt enters the upper part of the chiller cabinet 15 at a duct or other cabinet opening 17, leaves at a lower cabinet duct or outlet 18 position, and makes a return path from the unloading station 14 through a duct 19 if desired passing through a niche 20 in the cabinet to thereby prevent the belt from carrying any contamination back through the chiller unit from the unloading station 14 while using a short conveyor belt return path. Preferably the belt 11 passes through a cleansing unit 21 such as a detergent spray before new products 10 are inserted at the loading station 12.

The food is cooled by contact over the food surface with chilled water in the order of 5° C. approaching 0° C. obtained in the water cooler unit 22 by refrigeration at 23. The water supply 24 has purified water to assure that no contaminants enter by the water supply. The water provides an efficient heat exchange interface with the product and is circulated through the chiller unit 13 by pipeline 25 back through the water cooler by drain pipe 26.

Because many foods such as fish, meat or poultry parts are damaged in texture or appearance or are diluted or waterlogged by contact with water and should not come into direct contact with water or water droplets careful control is necessary to use the water heat exchange medium in a process universally acceptable for all food products which are moist and which need be protected against loss of flavor from juices or escape of essences or from capture of water or from dehydration. This critical control is achieved by the apparatus provided by this invention preferably located within the unitary chiller unit 13 in a common cabinet 15.

Thus, the cold water is sprayed as a mist from spray nozzles 27 located in a lower heat exchange compartment 28 at least partially isolated from the conveyor compartment 29. The water is carried into contact with the product as it rides downwardly on the spiral conveyor belt array 30 by means of a flow of saturated 100% humidity cold air filtered at 31 to remove any water droplets and circulated by fan 32 to pass upwardly in opposition to the path of the conveyor belt so that the colder products at the bottom encounter colder air directly from the spray chamber and the warmer products at the top can still have a heat exchange relationship with the entering warmer products at the top of the conveyor compartment 29.

Preferably the products 10 are of grades sizes and weights so they can be thoroughly chilled throughout as they traverse the spiral belt path 30 through the chilling chamber.

The pressure within the cabinet 15 preferably is kept above atmospheric by control of input air by fan 32 and exit air by means hereinafter described. This assures more chilling efficiency because of a rather magnetic type attraction to the product and internally in the product such as fruit, lettuce, meat parts or the like, which enter at lower pressure from outside atmospheric level. The chill time can be chosen by conveyor speed and the number of spiral belt convolutions within the chamber 29.

As may be seen from air flow lines 32, 33 the fan preferably provides a directed air flow routing through the conveyor chamber 29 such as by means of directing nozzle 34. This assures not only intimate contact with all product positions to exchange heat and carry away residual product heat, but it additionally improves energy efficiency by reducing losses of energy at both the entry position 35 of the conveyor belt and the exit position 36.

The air flow line 32 depicts a flow path that in the vicinity of belt entry position 35 in which the cool humid air returning to the heat exchange chamber 28 flows opposite to the belt travel direction. Thus there is created a dead air pocket and resistance to entrance of hot air carried in from external the chilling cabinet 15 by the belt 11, resulting in a reduction of losses of heat in a non-productive effort not chilling the product. Conversely flow of the air path 33 in the vicinity of the belt exit position 36 is opposite to the outgoing belt travel direction thereby resisting the carrying of a greater charge of the cool moist heat exchange air medium out of the chiller with the belt travel.

Further efficiencies are attained to reduce losses from entrance of heat or loss of coolant by the respective duct traps 17 and 18 to be hereinafter discussed.

It is seen from air paths 32 and 33 that the warmer coolant resulting from heat exchange with the products passes back into the heat exchange chamber 28 in a path avoiding contact with the product being chilled.

The return air circulation path encounters the freshly cooled water from spray nozzles 27 and dissipated warmer water is returned by piping 26. The sprays keep the air flow humidity at or near 100% at all times for maximum heat exchange efficiency with carriage of the maximum cold water into contact with the product being chilled.

This system has an additional advantageous feature in that sanitation is simply achieved by alternately connecting a cleaning detergent solution 38 rather than water for flushing the system and passing through the chilling unit 13.

Figure 3:
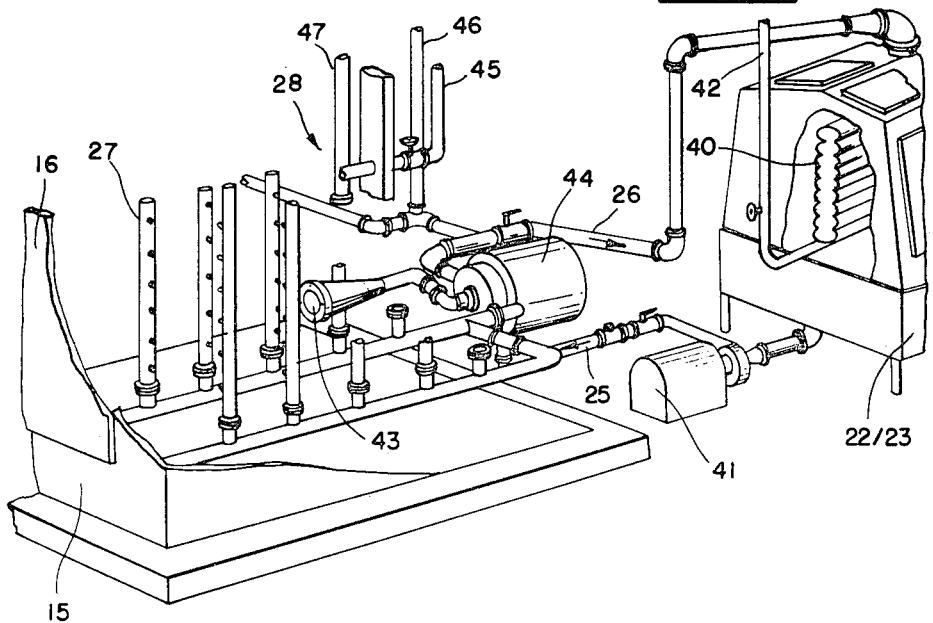
FIG. 3 is a diagrammatic view in perspective, partly broken away, of the water cooling and air humidifying system afforded by the invention.

The water refrigeration and spray heat exchange equipment is seen in FIG. 3, and similar reference characters as in FIGS. 1 and 2 are used throughout the remaining views for like features to facilitate ready comparison.

The refrigeration water cooling unit 22/23 is a conventional water cooling tower type of heat exchange unit with a heat exchange baffle 40 over which warmer water flows from input pipe 26 at the top downwardly in a sheet over the baffle 40 to be cooled and discharged at the pipe 25 under control of pump 41. Refrigerant such as ammonia, etc. is circulated within baffle 40 from bottom to top by means of piping 42, which is preferably insulated.

Positive discharge of water from the drain 43 of the heat exchange compartment 28 is effected by means of pump 44 thus passing water warmed by heat exchange relationship with the air circulated through the water spray mist in compartment 28. Sanitary water inlet pipe 45 permits charging and replacement of water losses. Alternatively a detergent solution is passed through the system by means of supply pipe 46 and is pumped out and salvaged at return pipe 47.

Figure 4:
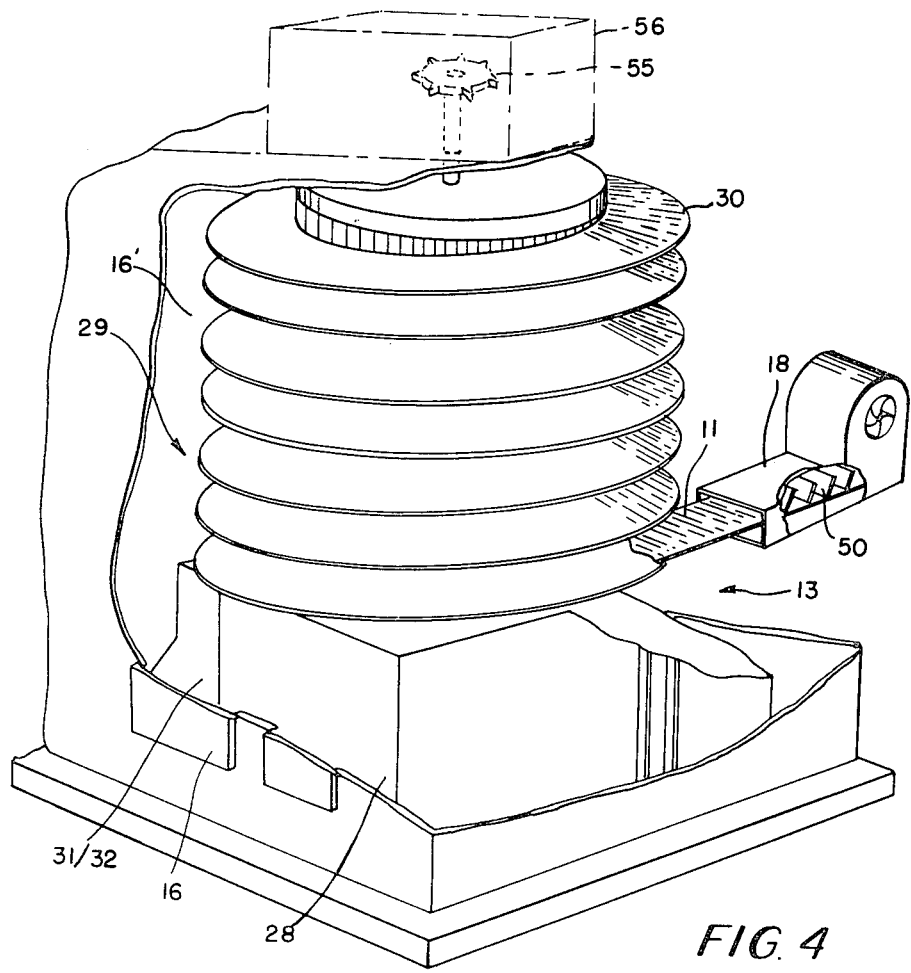
FIG. 4 is a diagrammatic view in perspective, partly broken away, of a food chilling chamber with a spiral conveyor belt pathway therethrough as afforded by the invention.

As seen in FIG. 4 the conveyor belt 11 exits chiller cabinet 15 at a duct 18. Counter flow directed baffles 50 tend to retard flow of cool air and cooling exchange medium in the form of water carried thereby from the conveyor compartment 29. Also the fan 51 collects residual air and provides a counter flow against the direction of belt travel, thus providing an efficient duct trap for retaining the pressurized atmosphere within the conveyor chamber 29 and for preventing loss of energy through loss of heat exchange medium as the belt passes out of the chilling unit 13. Similarly as shown in FIG. 1 the input duct trap 17 resists entry of warm air into the chiller unit 13 as the belt and products enter.

An additional critical feature is provided by placing the conveyor drive mechanisms such as chain sprocket 55 outside the chiller cabinet 15 in a separate compartment 56. This excludes any mechanisms requiring lubrication from the chilling unit with attendant heat losses and more importantly excluding probable contamination which would require special cleaning, maintenance and sanitation precautions.

Figure 5:
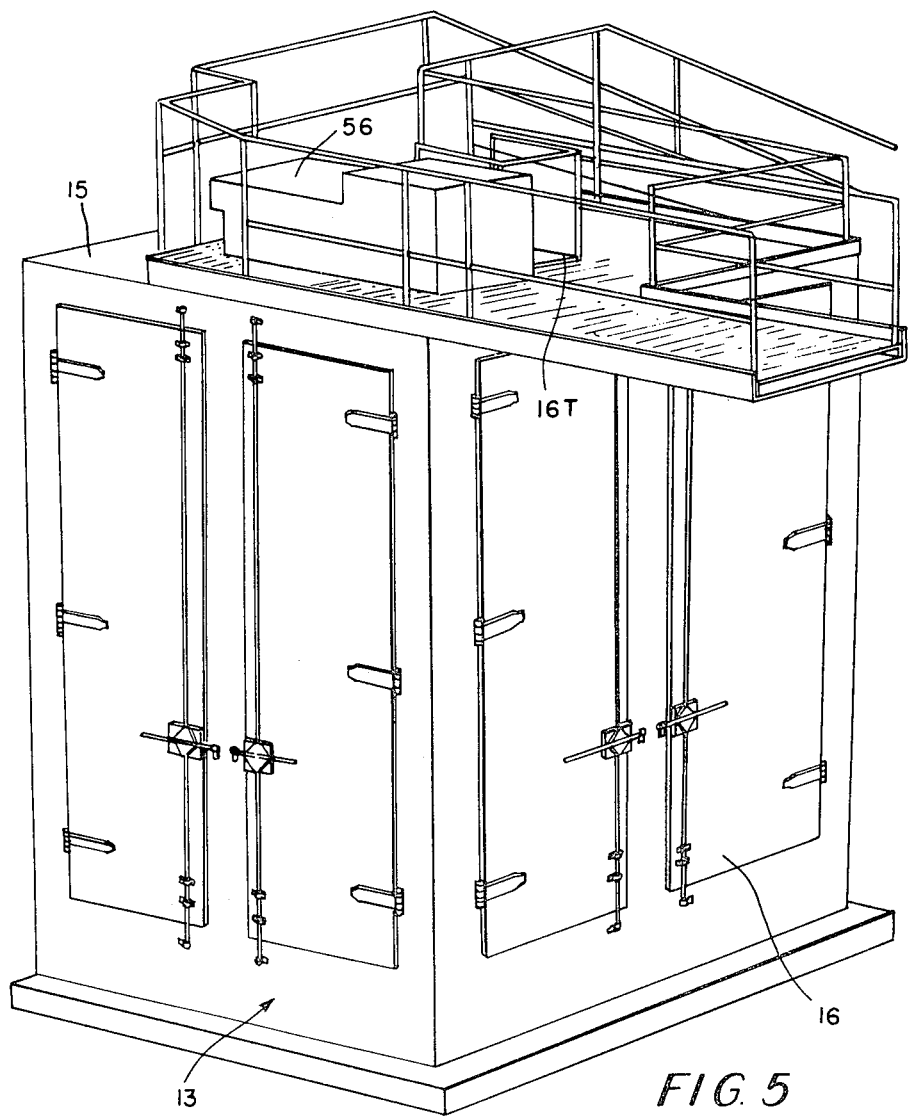
FIG. 5 is a perspective view of a chilling chamber cabinet afforded by the invention.

FIG. 5 gives a perspective view of a high volume chiller unit 13 in insulated cabinet 15 with the access doors 16 on each side and drive mechanisms isolated in appendage 56. A catwalk array 60 gives size perspective and provides for top access in a door 16T and for scheduled maintenance to the mechanism within compartment 56.

It is evident therefore that this invention has produced improved cooling methods and apparatus for volume processing of food products conveyed through a chilling unit on a continuously moving belt. Those features of novelty believed descriptive of the spirit and nature of the invention are set forth with particularity in the claims.

INDUSTRIAL APPLICATION

An energy efficient food cooler passes warm food products such as cooked meat, produce, or poultry through a cold moist air atmosphere on a conveyor belt to chill rapidly a large volume continuous throughput to a temperature approaching 0° C. without dehydration.

I claim:

1. The method of chilling warm food products to a sanitary storage temperature approaching 0° C. comprising the steps of chilling water to said temperature, spraying the chilled water as the sole coolant medium into an air convection stream in a location isolated from the food products to attain a humidity approaching 100%, and passing the chilled water about the food products in the air convection stream.

2. The method defined in claim 1 including the step of circulating the air convection stream cooled in a spray mist of water in continuous circulation through a refrigeration cycle.

3. The method defined in claim 2 including the step of moving warm food products through the air convection stream in a direction opposite the convection stream.

4. The method defined in claim 1 including the step of removing water droplets from the air convection stream to prevent wetting of the food products.

5. The method defined in claim 1 including the steps of introducing food products into a cabinet on a continuous conveyor belt, circulating the air convection stream within said cabinet to contact said food products and combining the chilled water with the air inside said cabinet by spraying the water into the air convection stream.

6. The method defined in claim 5 wherein the products introduced into said cabinet are warm, including the step of retaining the food products on the conveyor belt inside said cabinet until the temperature throughout the products attains substantially 2° C.

7. The method defined in claim 5 including the steps of passing warm food products into a conveyor belt spiral pathway through said cabinet with cooled products exiting said cabinet and passing the air convection stream in a circulatory path past the spray and into said spiral pathway near the exit of the belt from said cabinet before return to said spray in a path from near the entrance of the belt into the cabinet back to the spray not contacting the food products.

* * * * *